(12) United States Patent
Günther et al.

(10) Patent No.: US 7,506,920 B2
(45) Date of Patent: Mar. 24, 2009

(54) TORQUE CROSSMEMBER

(75) Inventors: Stefan Günther, Wiehl (DE); Hubertus Steffens, Drolshagen (DE)

(73) Assignee: ISE Innomotive Systems Europe GmbH, Bergneustadt (DE)

( * ) Notice: Subject to any disclaimer, the term of this patent is extended or adjusted under 35 U.S.C. 154(b) by 73 days.

(21) Appl. No.: 11/600,457

(22) Filed: Nov. 16, 2006

(65) Prior Publication Data

US 2007/0108802 A1    May 17, 2007

(30) Foreign Application Priority Data

Nov. 17, 2005    (DE) .................. 10 2005 055 396

(51) Int. Cl.
*B62D 21/02*    (2006.01)

(52) U.S. Cl. .................. 296/203.02; 296/193.09; 296/204

(58) Field of Classification Search ............ 296/187.08, 296/187.09, 193.02, 193.04, 193.07, 193.09, 296/203.01, 203.02, 204, 205, 30
See application file for complete search history.

(56) References Cited

U.S. PATENT DOCUMENTS

| 4,899,843 | A | * | 2/1990 | Takano et al. ............... 180/312 |
| 5,340,178 | A | * | 8/1994 | Stewart et al. ............... 293/122 |
| 5,593,001 | A | * | 1/1997 | Takano et al. ............... 180/312 |
| 6,068,330 | A | * | 5/2000 | Kasuga et al. .......... 296/187.09 |
| 6,408,974 | B1 | * | 6/2002 | Viduya et al. ............... 180/312 |
| 6,886,818 | B2 | | 5/2005 | Kim |
| 6,938,948 | B1 | * | 9/2005 | Cornell et al. ......... 296/187.09 |
| 7,232,005 | B2 | * | 6/2007 | Komatsu et al. ............ 180/299 |

FOREIGN PATENT DOCUMENTS

| DE | 38 10 751 | 10/1988 |
| DE | 100 24 164 | 11/2001 |
| DE | 101 17 589 | 10/2002 |
| DE | 102 06 472 | 8/2003 |
| DE | 10 2005 013 528 | 10/2005 |
| WO | 01/40008 | 6/2001 |

* cited by examiner

*Primary Examiner*—Glenn Dayoan
*Assistant Examiner*—Gregory Blankenship
(74) *Attorney, Agent, or Firm*—Hudak, Shunk & Farine Co. LPA

(57) ABSTRACT

A crossmember for supporting and limiting torsional forces of an engine unit relative to a mounting frame, particularly a vehicle body, wherein the crossmember is provided with at least one area or one device for introducing torsional forces into the crossmember.

22 Claims, 6 Drawing Sheets

TORQUE CROSSMEMBER

FIELD OF THE INVENTION

The invention pertains to a crossmember for supporting and limiting torsional forces of an engine unit relative to a mounting frame, particularly a vehicle body, wherein the crossmember is provided with at least one area or one device for introducing torsional forces into the crossmember.

BACKGROUND OF THE INVENTION

Crossmembers of this type are known from the state of the art. They are usually arranged in the front region of an engine compartment of a motor vehicle and serve for supporting the torsional forces introduced by the engine. This is intended to limit or absorb the tilting motion of the engine that is caused by the torsional forces under certain driving conditions.

A crossmember of this type is known, e.g., from DE 102 06 472 A1, wherein a crossmember with the approximate shape of a U in a side view is provided with a supporting bearing that is mounted on the upper side of the crossmember, i.e., in the region of the opening of the U-shape. The additional supporting bearing should only perform a support function once a defined clearance travel is exceeded, i.e., when a high torque threshold is exceeded. The additional supporting bearing is provided as a safety device for protecting the engine or transmission mountings from an overload. The supporting bearing receives a torque bracket fixed on the engine and a pin that protrudes in the longitudinal direction of the vehicle. The pin protrudes into a bushing mounted on the crossmember and surrounds the pin with a certain clearance such that an annular gap is formed between the pin and the bushing. This annular gap ensures the clearance travel for decoupling the pin from the bushing under normal loads. If more significant relative displacements between the engine and the crossmember occur, the pin comes in contact with the inner circumference of the bushing such that the supporting bearing performs a support function. However, the arrangement of the supporting bearing on the crossmember may lead to an undesirable deformation thereof when a force is introduced.

Other devices for supporting the torque of an internal combustion engine are also known from the state of the art, particularly DE 100 24 164 B4. In this publication, it is proposed to support a torque bracket consisting of a bracket arm and a brace that are connected by means of a bearing in such a way that one end of the bracket arm is connected to a cylinder head cover and/or a cam shaft housing by means of a rigid pivot bearing with a horizontal pivoting axis and the other end of the bracket arm is connected to the brace by means of a stationary elastic bearing with another horizontal pivoting axis, wherein the end of the brace is mounted on a structural member of the vehicle. This design is comparatively complicated and therefore associated with increased costs and installation expenditures.

DE 10 2005 013 528 A1 discloses a drive assembly mounting structure for mounting a drive assembly comprising an engine and a transmission in a motor vehicle. The assembly mounting structure comprises a pair of longitudinal supports that are arranged in the longitudinal direction of the vehicle, a crossmember that connects these longitudinal supports and a rod provided for connecting the drive assembly and the crossmember. The crossmember has a convex configuration that is curved opposite to the direction of a load introduced via the rod. A mounting for the roll control rod is arranged underneath the crossmember and realized in the form of a bushing.

U.S. Pat. No. 6,886,818 B2 discloses an engine mounting structure for a vehicle that is intended to absorb vibrations. To this end, a bushing for mounting the engine unit on the chassis is realized in a fluid-tight fashion. Two vertically arranged reinforcing elements used for connecting and holding the vertical reinforcing elements are also provided. They are mounted on the inner side of lateral chassis elements of the vehicle, namely at the locations at which the engine mountings are installed. The vertical reinforcing elements are arranged underneath mounting parts of the engine mountings. The mounting is realized with the aid of upper and lower flanges that are welded to the inner side of the lateral chassis element on the upper and lower side. A mounting on a crossmember of the vehicle is not realized in this case.

DE 101 17 589 A1 discloses a support arrangement for a drive assembly arranged within the front section of a vehicle. This publication describes a supporting frame that extends between the two longitudinal supports of the vehicle. The supporting frame should consist, in particular, of a high-strength material with a certain ductility that completely encloses the drive assembly.

DE 38 10 751 A1 discloses an embodiment of a crossmember arrangement, in which the crossmember is composed of a primary member and another shorter member. The primary member is realized in the form of a completely closed hollow profile that consists of two individual profiles connected by means of seaming or welding. The primary member accommodates the shorter member in its entirety. It is open in the region in which the connection with a drive assembly is produced such that the drive assembly can penetrate the hollow profile at this location.

The above-described known torsional support devices for engines are composed of various parts and therefore associated with high installation and manufacturing expenditures, as well as subject to the risk of twisting the crossmember if higher forces are introduced, namely despite the devices for increasing the rigidity that are provided in some of the described arrangements.

Consequently, the present invention is based on the objective problem of improving a crossmember for supporting and limiting torsional forces of an engine unit relative to a mounting frame, particularly a vehicle body, in such a way that the disadvantages of the prior art as well as the risk of deforming the crossmember, in particular, in the region in which the load is introduced into the crossmember are eliminated, wherein it should be simultaneously possible to adapt the crossmember, if applicable, to a restricted installation space and to limit the torque with the aid of the crossmember.

SUMMARY OF THE INVENTION

In a crossmember for supporting and limiting torsional forces of an engine unit relative to a mounting frame, particularly a vehicle body, in which the crossmember is provided with at least one area or one device for introducing torsional forces into the crossmember, this problem is solved in that the crossmember is provided with at least one device for increasing the rigidity that is integrated into the crossmember at least in the area for introducing torsional forces therein, wherein the at least one device for increasing the rigidity comprises at least one web provided in the crossmember profile and the crossmember is built of one or more hollow chamber profiles. Additional developments of the invention are defined in the dependent claims.

Consequently, a crossmember is created that is able to support as well as limit torsional forces in the region of at least one location for introducing torsional forces therein, wherein the rigidity of the crossmember is or can be adapted to the expected load in this region. Additional installation space is not required due to the integration of the device for increasing the rigidity into the crossmember. One respective device for increasing the rigidity can be integrated into the crossmember over the longitudinal extent thereof at the locations at which the introduction of torsional forces results in increased stresses. The at least one device for increasing the rigidity advantageously consists of at least one web provided in the crossmember profile. A web of this type that is arranged, in particular, in the central region of the crossmember profile makes it possible to increase the rigidity at least in the region in which the web is arranged within the profile of the crossmember. It is advantageous that the web is connected to two walls of the crossmember profile. The rigidity of the crossmember profile can be increased in the direction of the web by arranging the web, in particular, between two opposing walls of the hollow chamber profile.

The hollow chamber profile(s) allow an adaptation to the forces to be respectively introduced by selecting different shapes and/or wall thicknesses of the hollow chamber profile, wherein this hollow chamber profile may also be realized in a merely partially varying fashion in order to realize an adaptation in the region in which a load is introduced. This makes it possible to achieve improved rigidity properties, naturally also in combination with the web or the device(s) for increasing the rigidity that is/are or can be integrated into the crossmember and a more detailed description of which is provided further below. If a hollow chamber profile is provided for the crossmember, the web can be supported particularly well on two opposing walls of the crossmember profile and thusly divide the crossmember into two chambers. This configuration of the webs decelerates or prevents an additional deformation of the crossmember profile.

It is particularly advantageous to realize at least one web within the crossmember profile in an S-shaped or Z-shaped fashion. Such a web improves the buckling resistance of the crossmember due to the arrangement of its arms in different directions.

The device for increasing the rigidity advantageously comprises at least one embossment of one or more walls of the crossmember profile. Such an embossment purposefully reduces the height of the crossmember profile such that the available installation space that is often very small, particularly in the areas in which loads are introduced, can be easily observed despite the devices for increasing the rigidity. Several load introduction points and therefore several devices for increasing the rigidity may be provided. The height of the crossmember profile therefore can only be reduced locally in the area of the load introduction point. In this case, the rigidity of the crossmember profile is purposefully increased in the area or areas of the embossment(s) due to the reduction of the cross-sectional surface in this/these region(s).

An S-shaped or Z-shaped web within the crossmember profile, in particular, makes it possible for an embossment to additionally improve the buckling resistance of the crossmember in this region. In this case, the at least one embossment is advantageously provided in one or more walls of the crossmember profile that is/are essentially arranged transverse to the at least one web. It is advantageous that the embossment therefore is not provided in the walls on which the web is fixed, but rather in the walls on which the web is not fixed. Consequently, the embossment is advantageously produced transverse to the direction of the web. It is preferably realized such that the at least one web contacts the wall of the crossmember profile or is arranged so close to the wall(s) and/or the embossment(s) that the at least one web contacts and therefore is supported on at least one wall when a load is introduced into the crossmember. When the crossmember is subjected to a load, i.e., when a torque is introduced into the crossmember, this enables the web to contact the outer walls of the crossmember profile such that the buckling resistance of the crossmember profile can be additionally improved.

For example, a crossmember may be provided with a central web that extends over the entire longitudinal extent of the crossmember and, if applicable, is shaped differently over the longitudinal extent of the crossmember and comprises an embossment in only one area such that the rigidity is adapted to the load introduced at this location.

It is also advantageous that the crossmember is realized in a W-shaped fashion in a side view and respectively curved transverse to its longitudinal extent in the area in which torsional forces are introduced and in the area of the at least one embossment. This allows an even better support of torsional forces over the longitudinal extent of the crossmember. If combined with a variation of the intensity and the shape of the embossment over the longitudinal extent of the crossmember, the supporting capacity and the buckling resistance of the crossmember can be significantly improved in this fashion. In contrast to the prior art, this can be achieved without having to mount additional components.

In order to accommodate a torque bracket mounted on the engine or the engine unit, respectively, the crossmember is or can be connected to at least one supporting device. In light of the small installation space available in the area of the load introduction point of the crossmember, such a supporting device is advantageously arranged underneath the crossmember. For example, it features an opening for inserting the torque bracket, wherein the essentially flat element is arranged underneath the crossmember and connected thereto. The connection can be produced, for example, by means of welding, soldering, spot-welding, riveting or another connecting or joining method. It is also possible, in principle, to form the supporting device during the manufacture of the crossmember such that the crossmember and the supporting device are realized in one piece. The opening for inserting the torque bracket into the supporting device is preferably arranged in the region of the embossments or embossment of the crossmember profile or, vice versa, the embossment(s) is/are arranged in the region of the opening in the supporting device that serves for inserting the torque bracket. The torque bracket is preferably also provided with a buffer for being supported on the crossmember, wherein a damping effect can also be achieved by encasing the torque bracket with a flexible, elastic material. For example, the buffer comprises a rubber casing for the torque bracket that consists, e.g., of a metal part.

In order to be mounted in a frame construction in which the engine unit is arranged, particularly the vehicle body, the ends of the crossmember are advantageously provided with mounting devices, particularly mounting flanges. These mounting devices and the crossmember profile may either be realized in one piece or connected to one another. For example, the mounting flanges are realized in the form of bent sheet metal parts and joined to or mounted on the ends of the crossmember, e.g., by means of welding, soldering, riveting or another joining method.

The utilization of a hollow chamber profile that is essentially realized in one piece with the supporting device and arranged in the region of load introduction points makes it possible to transmit the introduced forces to the mounting flanges within the crossmember profile, namely without having to transmit the torsional forces via joint seams. The one or more hollow chamber profiles preferably has/have an essentially closed cross section. This makes it possible to advantageously improve the rigidity of the crossmember because closed profile cross sections are able to support higher compressive forces in the longitudinal direction of the profile than open profile cross sections.

It is also particularly advantageous to realize the crossmember profile or the one or more hollow chamber profiles of the crossmember in the form of extruded profiles, particularly extruded aluminum profiles, because a weight advantage can be achieved with this measure in addition to or independently of the advantages attained with the embossment or the arrangement of a central web or web within the crossmember profile. It is not only possible to vary the wall thickness of at least one hollow chamber profile, but also the wall thickness of individual areas of a hollow chamber profile. This allows a particularly simple adaptation of the crossmember rigidity in the area of the load introduction points.

Due to the embossments, it is not required to weld on additional components in the area of the load introduction point as it is the case, for example, with the supporting bearing in DE 102 06 472 A1 such that the structure of the inventive crossmember profile is not weakened due to the application of heat occurring during the welding process. According to the invention, the realization of an embossment or embossments provides a safe, simple and simultaneously cost-efficient method for increasing the rigidity, the advantages of which become particularly apparent in the manufacture of larger quantities of crossmembers.

It is furthermore advantageous to realize the device for introducing torsional forces in the form of an essentially flat element or in the form of a frame-shaped supporting device that is realized in one piece with the crossmember or can be mounted thereon. In contrast to a more massive construction with sheet metal parts, a frame-shaped supporting device makes it possible to reduce the weight. It is advantageous to provide at least one supporting element for obliquely supporting the frame-shaped device relative to the crossmember such that a particularly high rigidity of the crossmember can also be achieved in this lower region. Compressive forces occurring in the lower region of the crossmember can be supported very well in this fashion. The crossmember profile and/or the supporting element is/are advantageously realized in the form of an extruded component. This allows a simple manufacture that is also very economical because it is not excessively time-consuming. In order to additionally reduce the costs, the supporting elements may be cut off in the end regions at approximately identical angles such that they can be mounted on the crossmember and on the frame-shaped supporting device in a laterally reversed fashion. However, in irregularly shaped crossmembers, the supporting elements naturally are adapted to the extent of the crossmember and the frame-shaped supporting device(s) is/are adapted to the crossmember in order to ensure an optimal support of the frame-shaped supporting device relative to the crossmember.

It is advantageous to provide at least one reinforcing element for being inserted into an angular region of the crossmember. This measure makes it possible to also reinforce the crossmember in other regions, particularly with respect to compressive forces. Such a reinforcing element proves particularly advantageous for preventing the undesirable buckling of the crossmember in regions of the longitudinal extent of the crossmember in which the bending angles are smaller.

BRIEF DESCRIPTION OF THE FIGURES

In order to further elucidate the invention, embodiments thereof are described in greater detail below with reference to the figures, wherein.

DETAILED DESCRIPTION OF THE INVENTION

Figure 1:
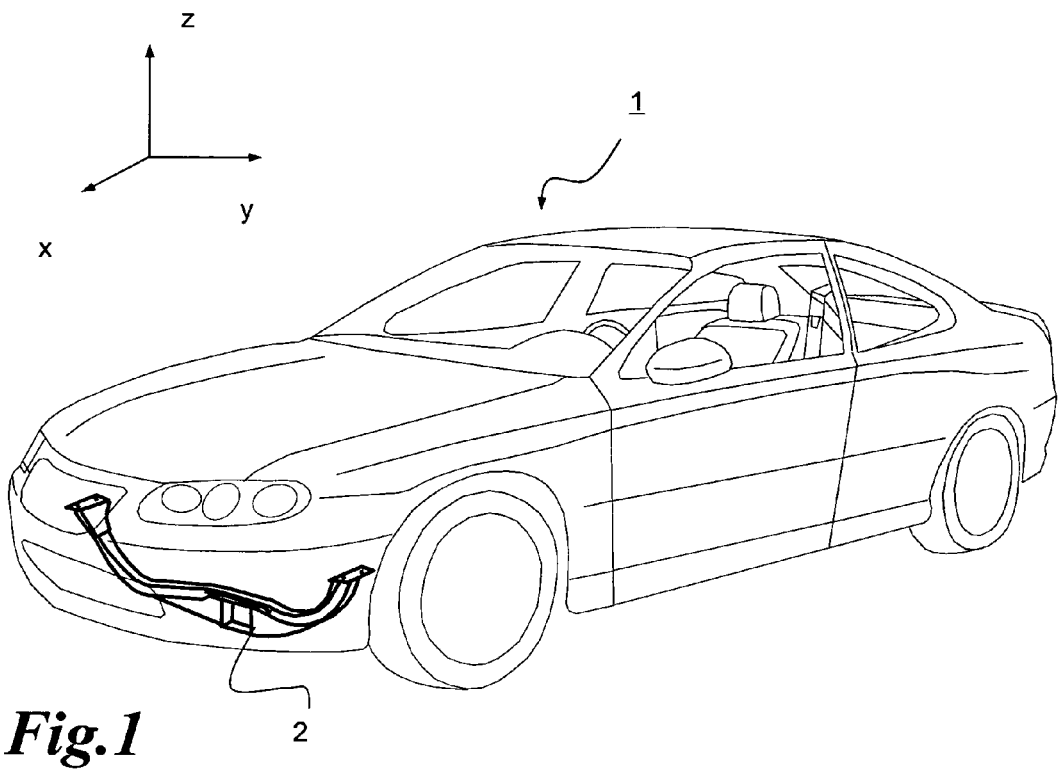
FIG. 1 shows a perspective representation of a vehicle with a crossmember according to the present invention provided on the front side of the engine compartment.

FIG. 1 shows a perspective representation of a vehicle 1 having a crossmember 2 for supporting torsional forces in its front area. The crossmember is arranged in the front area of the vehicle engine compartment. It serves for supporting torsional forces that are introduced into the crossmember along the three spatial axes, e.g., in the Z-direction, such that a tilting motion of the engine can take place along the three spatial axes, e.g., along the Y-axis, under certain driving conditions, wherein this tilting motion can be limited with the aid of the crossmember.

Figure 2:
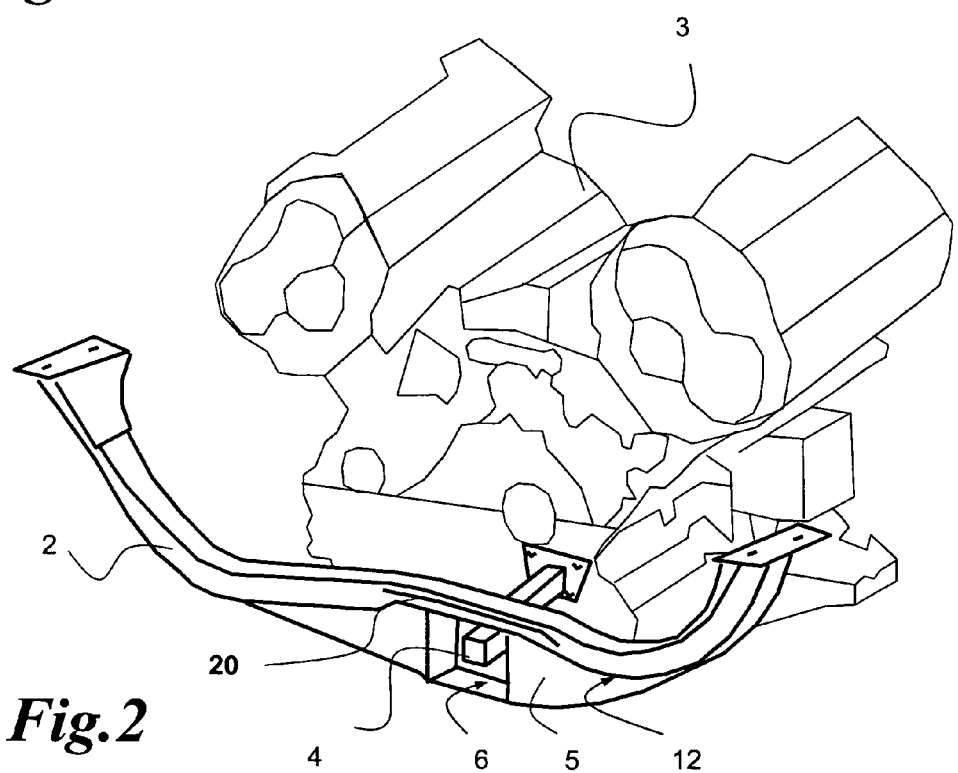
FIG. 2 shows a schematic perspective representation of an engine unit with a torque bracket and the crossmember according to FIG. 1.

FIG. 2 shows a detail of an engine unit 3 arranged in the engine compartment of the vehicle 1 and better elucidates how a torque bracket 4 protrudes into the crossmember through an opening 6 in a supporting device 5. The supporting device is arranged on the underside 12 of the crossmember. The crossmember 2 is realized in an approximately W-shaped fashion in a side view, wherein the supporting device is arranged on the underside of the crossmember in an area that bulges upward, i.e., the central region of the W. This is illustrated even better in FIGS. 3 and 7 that respectively show a side view of the crossmember 2.

The crossmember is realized in the form of a hollow chamber profile, particularly an extruded profile. The supporting device 5 may be realized in the form of a sheet metal part, if applicable, as a hollow chamber profile as well. The supporting device 5 comprises the opening 6 for inserting the torque bracket 4. It has an approximately rectangular shape in this embodiment of the crossmember. However, it may also have another shape that is adapted to the respective shape of the torque bracket 4.

Figure 3:
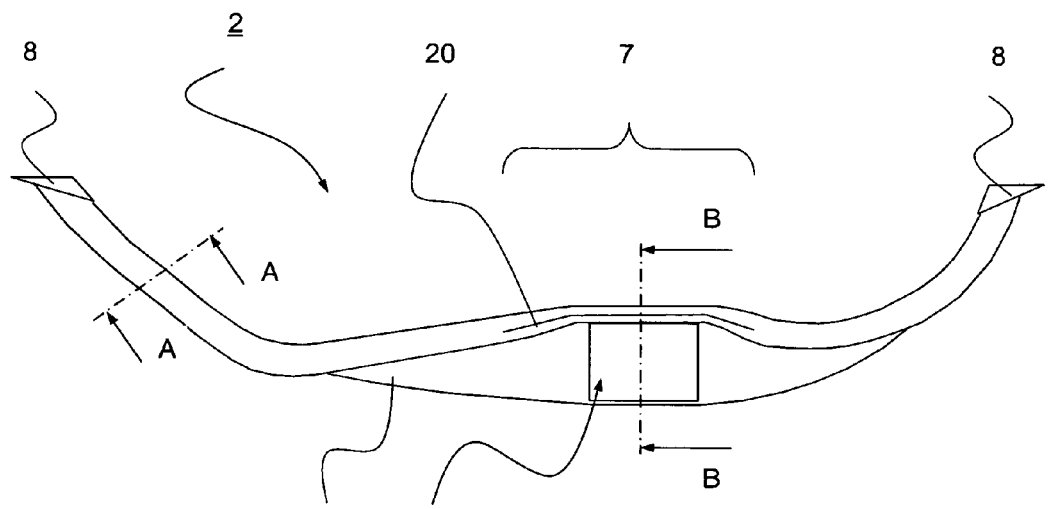
FIG. 3 shows a side view of the crossmember according to FIG. 2.
Figure 4:
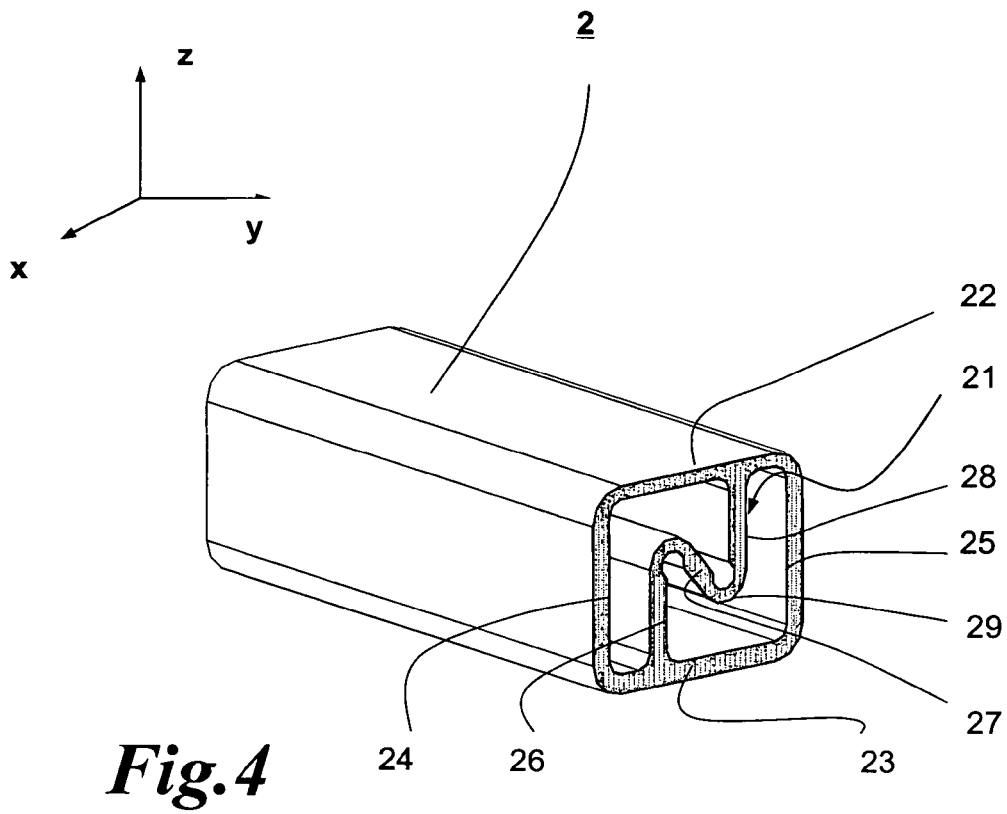
FIG. 4 shows a perspective representation of a detail of the crossmember according to FIG. 3 taken along the line of section A-A.

As indicated in FIG. 2 but better elucidated in FIG. 3, the area 7 of the crossmember 2 in which the torsional forces of the engine unit are introduced via the torque bracket is provided with a device for increasing the rigidity. This is realized in the form of an embossment 20 in the sidewalls of the hollow chamber profile of the crossmember 2. The crossmember is furthermore provided with an interior web 21 over its longitudinal extent, wherein this interior web also provides the crossmember with improved rigidity. The cross-section A-A through the edge region of the crossmember is illustrated in the form of a perspective detail in FIG. 4. This figure shows that the web 21 is realized in an S-shaped or Z-shaped fashion, respectively. Therefore, forces can be supported even better by means of this interior web of the crossmember, wherein the buckling resistance of a crossmember, in particular, can also be improved with the aid of such a web.

The web 21 is fixed on the two walls 22, 23 of the crossmember 2, wherein both walls 22, 23 lie opposite to one another. The web 21 comprises a first arm 26 and a second arm 28 that are arranged approximately parallel to the sidewalls 24 and 25 of the crossmember, i.e., approximately perpendicular to the sidewalls 22, 23. The two arms 26 and 28 are connected to one another by a central arm 27. A nominal or predetermined folding point 29 is respectively provided in the area of the transition between the arms 26 and 27 and the arms 27 and 28, respectively, in order to achieve a certain elasticity of the web 21 as well as a purposeful deformation and support of the webs in this area.

Figure 5:
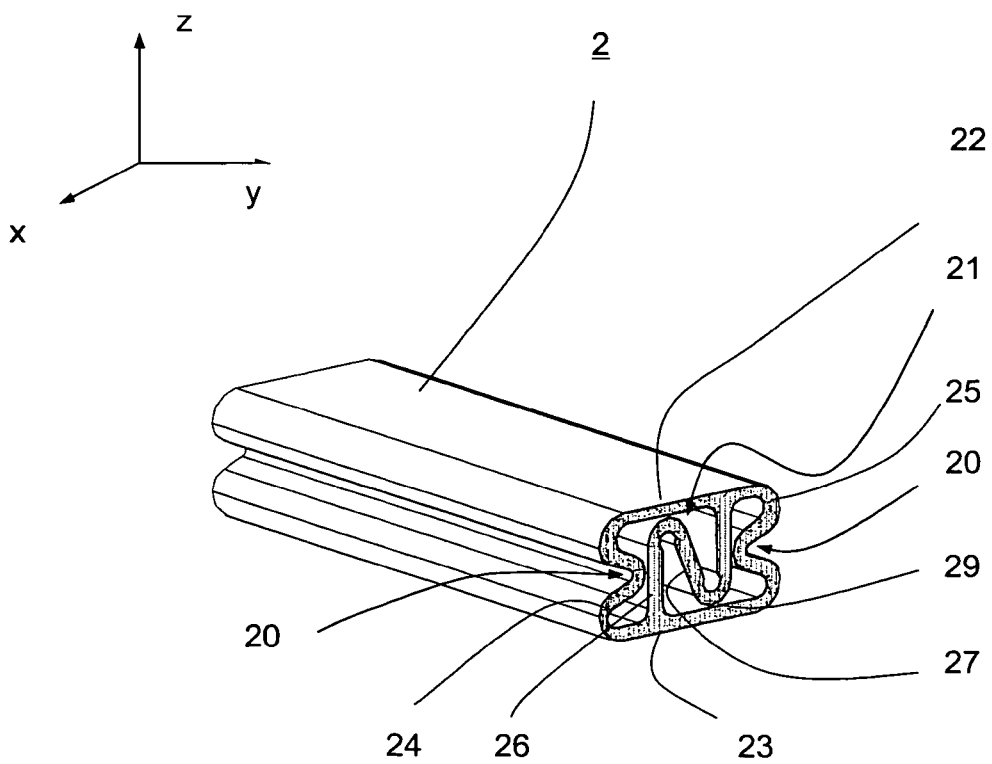
FIG. 5 shows a perspective representation of a detail of the crossmember according to FIG. 3 taken along the line of section B-B, namely also in the area of an embossment.

FIG. 5 shows a section through the crossmember in the area B-B in FIG. 3, wherein embossments are arranged in the side walls 24, 25 of the crossmember in order to additionally increase the rigidity. The embossments 20 protrude into the interior of the crossmember profile and almost extend as far as the arms 26 and 28 of the web 21. The two nominal or predetermined folding points 29, i.e., the transitions between the arms 26 and 28 and the central arm 27 of the web, almost extend as far as the walls 22 and 23 of the crossmember profile. If a force is introduced into the crossmember in the area 7 thereof, this not only makes it possible to support torsional forces particularly well due to the particularly high rigidity of the crossmember, but also to prevent the profile of the crossmember from buckling. The embossment furthermore results in a reduced height of the crossmember such that the crossmember can also be easily installed if the available installation space is restricted.

According to FIG. 3, the crossmember profile is merely embossed within a limited region. Consequently, the rigidity is primarily increased in the form of strain hardening by means of the deformation or reduction of elasticity in this region. The motion of the engine unit, particularly when starting or under other critical operating conditions, can be limited particularly well in this case and, in comparison with known crossmembers, without requiring additional components, i.e., with a reduced weight as well as in a less costly and complex fashion.

Figure 7:
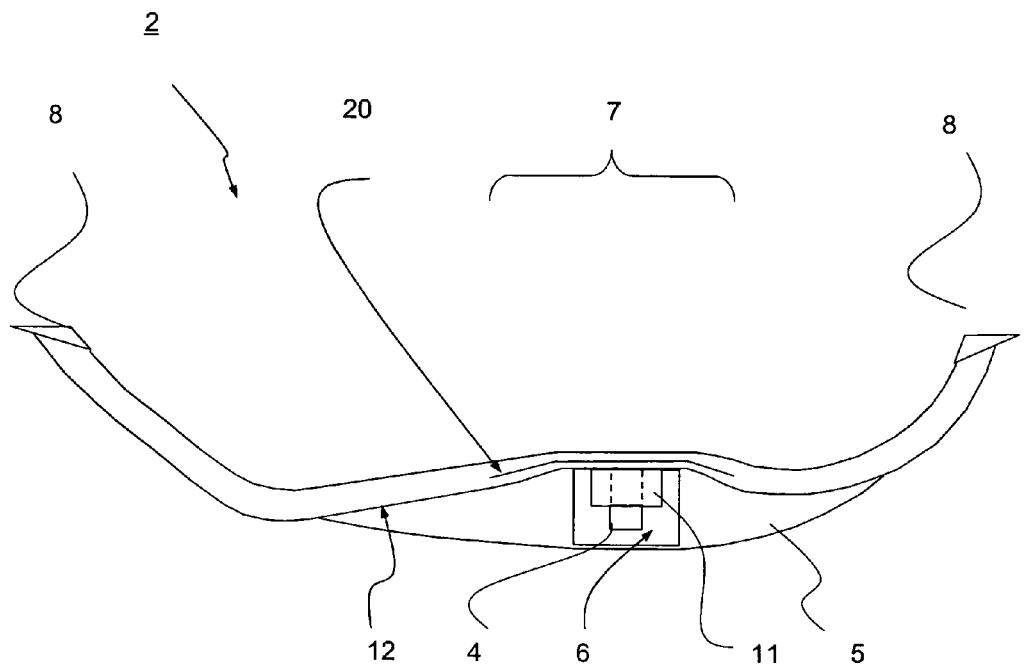
FIG. 7 shows a side view of the crossmember according to FIG. 2 with inserted torque bracket.

FIGS. 3 and 7, in particular, show that the crossmember is not realized symmetrically over its longitudinal extent, but rather has the shape of a sloping W. This not only makes it possible to realize an adaptation of the torque bracket position to the engine unit, but also an adaptation to the available installation space in the front area of the vehicle. In a different arrangement of the torque bracket or, if applicable, an arrangement with several torque brackets, the shape of the crossmember can be altered accordingly and adapted to the special circumstances. A connection with the vehicle body can be produced by means of mounting flanges 8 on the ends of the crossmember.

Figure 6:
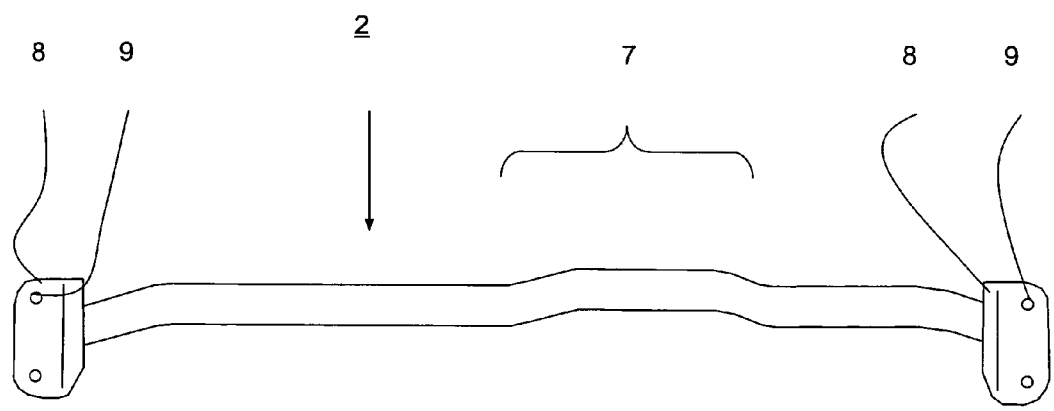
FIG. 6 shows a top view of the crossmember according to FIG. 2.
Figure 8:
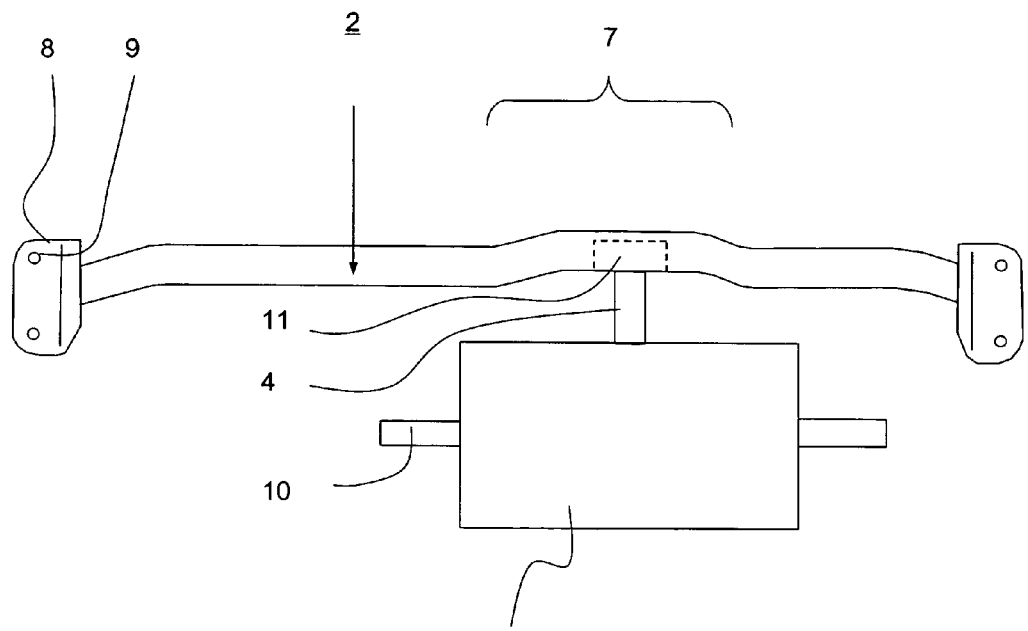
FIG. 8 shows a top view of the crossmember according to FIG. 7 together with an engine unit.
Figure 9:
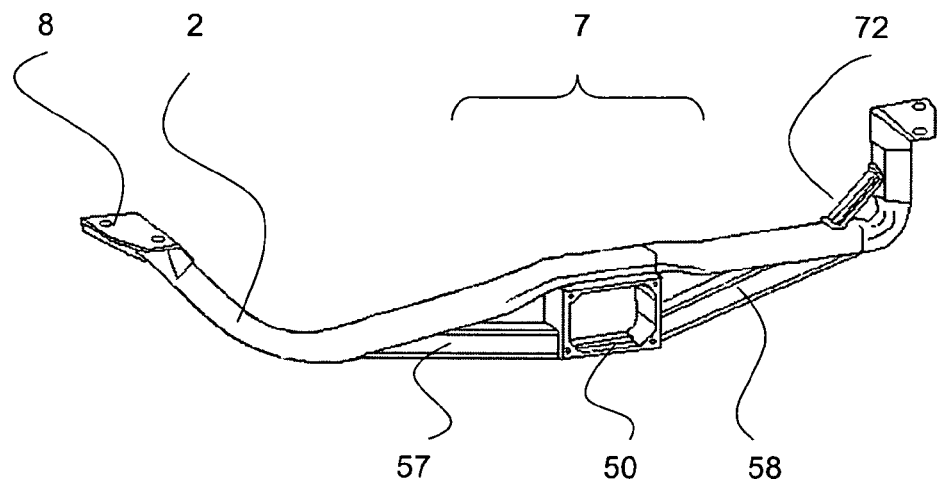
FIG. 9 shows a perspective representation of a second embodiment of a crossmember according to the present invention.
Figure 10:
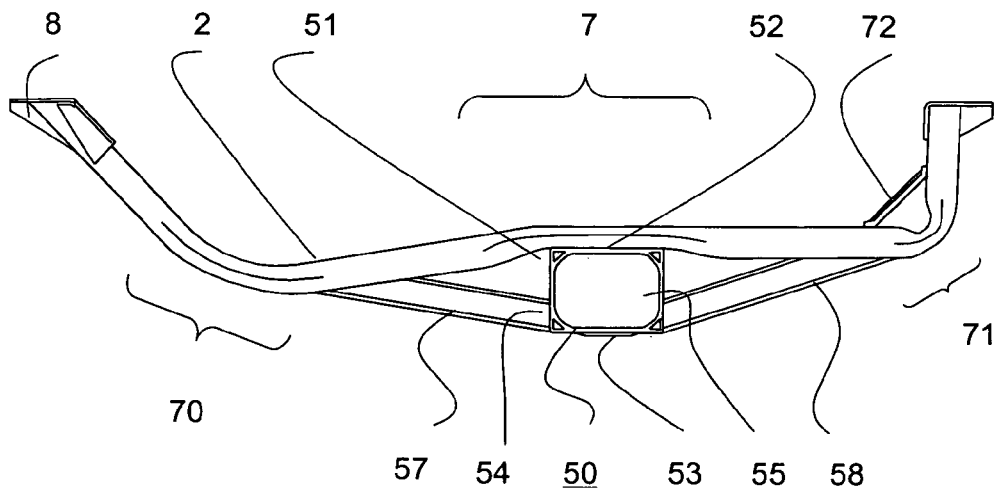
FIG. 10 shows a side view of the crossmember according to FIG. 9.

The mounting flanges 8 that are illustrated particularly well in the top views of the crossmember according to FIGS. 6 and 8 are realized in the form of separate parts and joined to the ends of the crossmember. For example, they may be realized in the form of shaped sheet metal parts and attached and connected to the ends of the crossmember, e.g., by means of welding or soldering. The mounting flanges comprise mounting holes 8 in order to produce a connection with the vehicle body, for example, a screw connection. Naturally, it is also possible to utilize a different mounting method, in which case the mounting flanges are realized accordingly.

The top views according to FIGS. 6 and 8, in particular, show that these embodiments of the inventive crossmember are also not realized symmetrically in a top view, but rather asymmetrically with projecting and curved regions. The area 7, in particular, represents such a projecting curved region for the load introduction, wherein the curvature is directed away from the engine unit 3 as shown in FIG. 8. Although this causes the torque bracket 4 to engage, in principle, with area 7 for introducing the load into the crossmember with a longer lever arm, a superior load absorption and therefore a superior limitation of the torque can be realized due to the curvature. However, it would also be possible, in principle, to realize the crossmember essentially straight in a top view if this proves more practical for individual applications.

The top view of the inventive crossmember 2 and the engine unit 3 according to FIG. 8 shows that the engine unit 3 is usually also suspended or supported on both sides of the vehicle body by means of corresponding engine mountings 10. These mountings may be realized, for example, in the form of buffer elements consisting of a combination of metal and an elastic material such as, for example, rubber in order to achieve a dampening effect. The torque bracket 4 may also engage on the crossmember by means of a corresponding buffer element 11 that preferably comprises an elastic coating element, for example, of rubber or another correspondingly elastic material in order to encase the torque bracket that usually consists of a metal in a dampening fashion. According to FIG. 7, the buffer element 11 is then situated on the underside 12 of the crossmember in the area 7 provided with means or the device for increasing the rigidity of the crossmember in the form of the embossments 20 and the web 21.

At the transition to the non-embossed area of the crossmember, the embossments may have a continuously decreasing intensity such that no abrupt transition is created between the embossed and the non-embossed areas of the crossmember, but rather a continuous transition that allows a superior force introduction. In this case, the risk of the crossmember buckling in the region of the transition is eliminated because the torsional force is essentially introduced into the profile of the crossmember without force peaks.

Instead of providing an S-shaped or Z-shaped web 21, it would also be possible, in principle, to realize the web arranged within the crossmember profile in an essentially straight fashion or with a different shape. The shape of the web as well as the number of webs within the profile may be dependent on the expected forces acting upon the crossmember profile and on the required rigidity of the crossmember profile. The profile otherwise remains constant over the entire length with the exception of the embossment that causes partial changes. It would be possible, in principle, to vary and adapt the shape, the thickness and the dimensions of the web or the number of webs over the longitudinal extent of the crossmember to the respectively required rigidities in certain sections of the crossmember. However, the dimensions of the profile, particularly the wall thicknesses, usually remain constant over the length of the profile. The outside dimensions can only be varied by providing the embossment or embossments.

FIGS. 9 to 13 show another embodiment of an inventive crossmember 2. This embodiment can be distinguished from the above-described embodiment in that the supporting device is realized in the form of a frame-shaped element rather than an essentially flat element and identified by the reference symbol 50 in FIGS. 9 to 13. The frame-shaped supporting device 50 consists of an extruded component in the embodiment shown in FIGS. 9 to 13. According to the side view of the crossmember 2 shown in FIG. 10, the frame-shaped supporting device comprises respective supporting webs 51 in its corners in order to reinforce these corner regions. The essentially rectangular frame-shaped supporting device comprises a wider and a narrower wall as shown in the bottom view of the crossmember according to FIG. 11, wherein the wider wall 52 is connected to the embossment area, i.e., the area 7 for introducing a load, while the opposing wall 53 of the frame-shaped supporting device is narrower. The two side walls 54, 55 of the frame-shaped supporting device that connect the walls 52 and 53 therefore have a trapezoidal shape as shown particularly well in the perspective side view according to FIG. 13.

Figure 11:
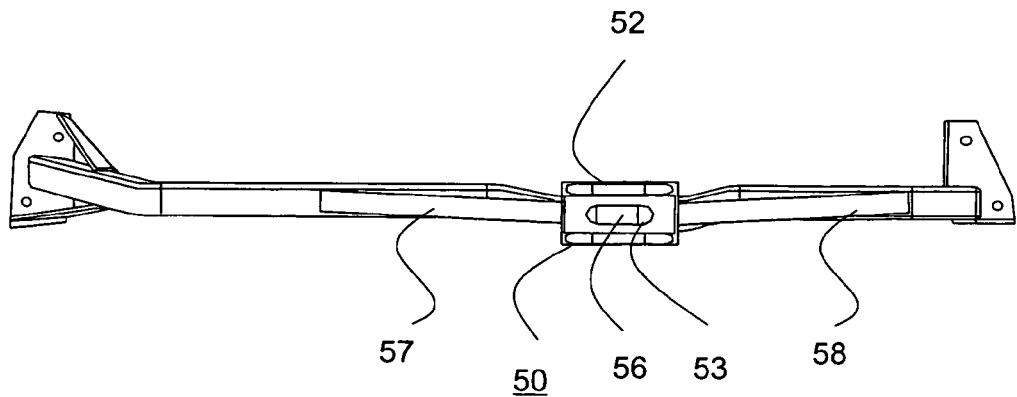
FIG. 11 shows a bottom view of the crossmember according to FIG. 9.

In order to additionally reinforce the frame-shaped supporting device in the area of the narrower wall 53, it comprises an embossment 56 that has an elongated oval shape in this embodiment as shown in FIG. 11. It may, in principle, also have another shape or be omitted entirely as long as the stability of the frame-shaped supporting device would not be compromised.

Obliquely arranged supporting elements 57, 58 are provided in order to connect the frame-shaped supporting device to the profile of the crossmember and to support the crossmember relative to the frame-shaped supporting device. These supporting elements are advantageously realized in the form of extruded components as well. They may be realized in one piece with the frame-shaped supporting device or mounted thereon. The supporting elements 57, 58 in the form of struts are furthermore realized in the form of hollow chamber profiles analogous to the crossmember 2 itself. Such closed profile cross sections as they are provided for the supporting elements 57, 58 as well as the frame-shaped supporting device in FIGS. 9 to 13 make it possible to support higher compressive forces in the longitudinal direction of the profile than it would be possible with an open profile cross section. Although it would be possible, in principle, to utilize an open profile cross section, one would have to accept the disadvantage of possibly risking damages to the entire supporting device including the supporting elements if higher compressive forces need to be supported. A variation of the wall thickness of the individual supporting elements and the frame-shaped supporting device also makes it possible to realize an adaptation to different requirements with respect to the supporting capacity of the supporting elements and the frame-shaped supporting device, respectively. The embossment 56 results in an increased rigidity in the region of the wall 53 that lies in the force transmitting direction referring to the supporting elements 57, 58, namely at exactly this particularly stressed wall 53. If the supporting elements 57, 58 are realized separately of the frame-shaped supporting device and the crossmember is designed accordingly, it is possible to realize identical cutting angles at the ends of the supporting elements such that the supporting elements can be positioned in a laterally reversed fashion and the least scrap possible is produced, wherein the individual components only vary slightly such that a simple and cost-efficient manufacture is achieved. However, this is not entirely the case in the embodiment according to FIGS. 9 to 13 due to the irregular shape of the crossmember 2.

In contrast to the embodiments of the crossmember according to FIGS. 1 to 8, the crossmember according to FIGS. 9 to 13 comprises three embossment areas over its longitudinal extent, namely the area 7 in which the load is introduced as well as the additional areas 70, 71, both of which consisting of angled regions of the crossmember. The embossment area 71 forms an approximately right-angled bend while the embossment area 70 forms an obtusely angled bend. The supporting elements 57, 58 are arranged such that they extend from the frame-shaped supporting device in the direction of the two embossment areas 70, 71 with respect to the force transmitting direction. An additional reinforcing element 72 is provided in order to additionally reinforce the approximately right-angled embossment area 71. The reinforcing element 72 therefore supports the two limbs of the crossmember 2 that flank the reinforcement area 71 relative to one another.

The mounting flanges 8 are slightly modified in comparison with the embodiment shown in FIGS. 1 to 8 and thus are adapted to the mounting surface in the engine compartment of the vehicle. Alternatively to the shown embodiment of a bent sheet metal part that is connected to the crossmember profile, the mounting flange may be realized in a web-shaped fashion and/or realized in one piece with the crossmember profile. The crossmember profile itself is also realized in the form of a profile that comprises one or more hollow chambers in this embodiment, particularly an extruded component.

Figure 12:
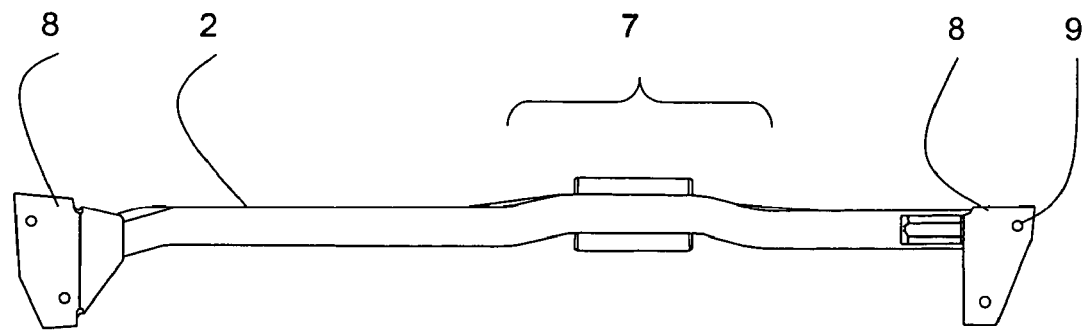
FIG. 12 shows a top view of the crossmember according to FIG. 9.
Figure 13:
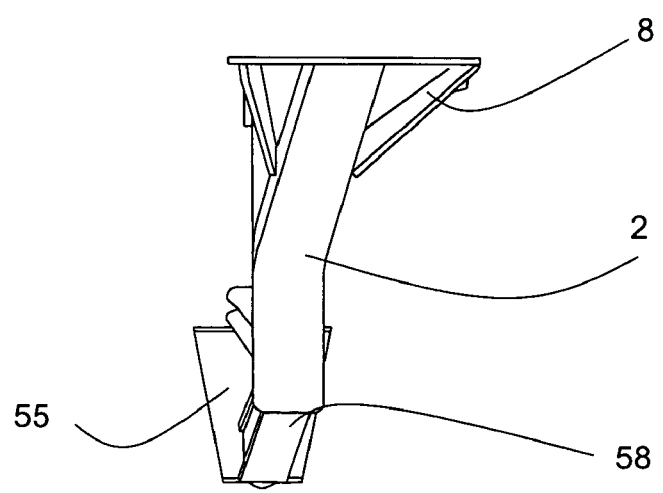
FIG. 13 shows a perspective representation of the crossmember according to FIG. 9 that is turned by 90°.

FIG. 12 shows particularly well that, analogous to the embodiment according to FIG. 8, the crossmember only deviates from the essentially straight shape in a top view within the area 7 in which the load is introduced so as to better support the load and therefore also limit the torque.

In addition to the above-described and illustrated embodiments of an inventive crossmember for supporting and limiting torsional forces introduced into the crossmember by an engine unit so as to limit the movement of the engine under certain operating conditions, particularly when starting, it is possible to realize numerous other embodiments in which a device for increasing the rigidity is respectively integrated into the crossmember. In this case, it is also possible, in principle, to merely provide an embossment in the outer walls of the crossmember, wherein a combination of an embossment and a web or webs within the crossmember results in an additionally improved rigidity. It is advantageous that the embossments do not increase the weight of the crossmember in comparison with a non-embossed crossmember, but rather only result in the desired rigidity increase and torque limitation. Instead of providing the crossmember and/or elements mounted thereon or realized in one piece therewith with a hollow chamber profile, it would also be possible, in principle, to choose an open profile cross section although a particularly high rigidity can be achieved with a closed profile.

What we claim is:

1. A crossmember for supporting and limiting torsional forces of an engine unit relative to a mounting frame, the crossmember comprising: at least one area or one device for introducing torsional forces into the crossmember, wherein the crossmember is provided with at least one device for increasing the rigidity that is integrated into the crossmember at least in the area for introducing torsional forces therein, and wherein the at least one device for increasing the rigidity comprises at least one web provided in the crossmember profile and the crossmember is built of one or more hollow chamber profiles, wherein the at least one device for increasing the rigidity comprises at least one embossment in one or more walls of the crossmember profile, and wherein the at least one embossment is arranged in such a way that the at least one web contacts walls of the crossmember profile or is arranged so close to the walls of the crossmember profile that the at least one web contacts and is supported on at least one wall when a load is introduced into the crossmember.

2. The crossmember according to claim 1, wherein the at least one web is connected to at least one wall of the crossmember profile.

3. The crossmember according to claim 1, wherein the at least one web is connected to two opposing walls of the crossmember profile.

4. The crossmember according to claim 1, wherein the at least one web is S-shaped or Z-shaped.

5. The crossmember according to claim 1, wherein the at least one embossment is arranged in one or more walls of the crossmember profile that extend(s) essentially transverse to the at least one web.

6. The crossmember according to claim 1, wherein the crossmember is arranged in a W-shaped fashion in a side view and curved transverse to its longitudinal extent in the area of the at least one embossment.

7. The crossmember according to claim 1, wherein the embossment is arranged with varying intensity and/or shape over the longitudinal extent of the crossmember.

8. The crossmember according to claim 1, wherein at least one supporting device is provided for accommodating a torque bracket of the engine unit and is connected to the crossmember.

9. The crossmember according to claim 8, wherein the supporting device comprises at least one opening for inserting the torque bracket.

10. The crossmember according to claim 1, wherein the ends of the crossmember are provided with mounting flanges, for mounting the crossmember on the mounting frame.

11. The crossmember according to claim 1, wherein the crossmember is arranged in the form of a two-chamber or multi-chamber profile.

12. The crossmember according to claim 1, wherein the one or more hollow chamber profiles have an essentially closed cross section.

13. The crossmember according to claim 1, wherein the one or more hollow chamber profiles are arranged in the form of extruded profiles.

14. The crossmember according to claim 1, wherein the one or more hollow chamber profiles are arranged in the form of extruded aluminum profiles.

15. The crossmember according to claim 1, wherein the wall thickness of at least one hollow chamber profile or of individual areas of at least one hollow chamber profile can be varied.

16. The crossmember according to claim 8, wherein the supporting device or the area for introducing torsional forces into the crossmember is arranged in the form of a frame-shaped supporting device and is mounted on the crossmember.

17. The crossmember according to claim 16, wherein at least one supporting element is provided for obliquely supporting the frame-shaped supporting device relative to the crossmember.

18. The crossmember according to claim 17, wherein the crossmember profile and/or the at least one supporting element and/or the supporting device is arranged in the form of one or more hollow chamber profiles.

19. The crossmember according to claim 1, wherein at least one reinforcing element is provided for being inserted into an angled area of the crossmember.

20. The crossmember according to claim 19, wherein the angled area comprises at least one embossment.

21. The crossmember according to claim 16, wherein the frame-shaped supporting device is provided with one or more embossments in order to increase the rigidity.

22. The crossmember according to claim 18, wherein the cross-member profile and/or at least one supporting element and/or the supporting device is arranged in the form of an extruded component.

* * * * *